N. M. HANSEN.
WEIGHING SCALE.
APPLICATION FILED AUG. 30, 1907.
960,905.
Patented June 7, 1910.
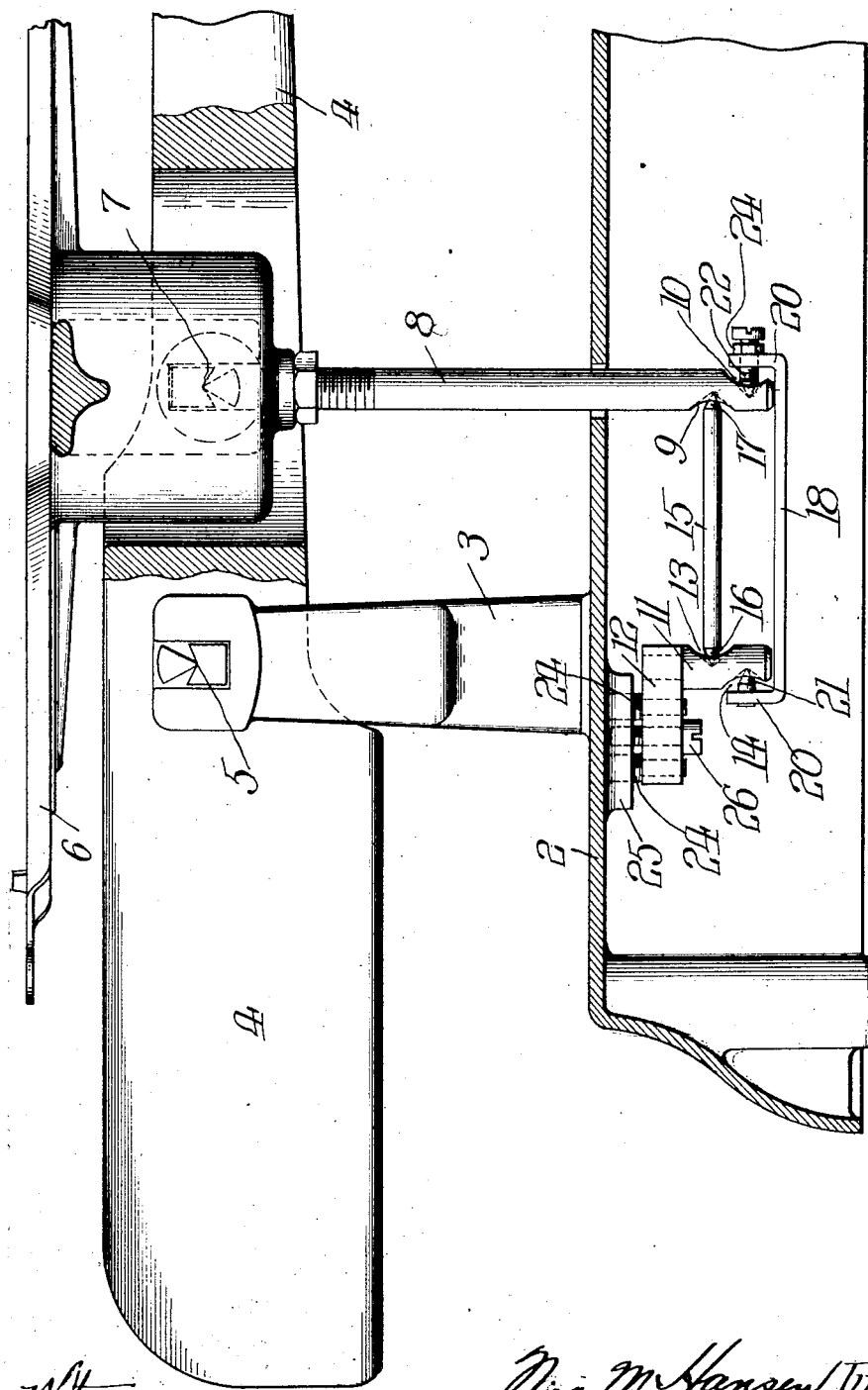

UNITED STATES PATENT OFFICE.

NIELS M. HANSEN, OF TOLEDO, OHIO, ASSIGNOR TO TOLEDO COMPUTING SCALE COMPANY, OF TOLEDO, OHIO, A CORPORATION OF NEW JERSEY.

WEIGHING-SCALE.

960,905.  Specification of Letters Patent.  Patented June 7, 1910.

Application filed August 30, 1907. Serial No. 390,782.

*To all whom it may concern:*

Be it known that I, NIELS M. HANSEN, a citizen of the United States, residing at Toledo, Lucas county, Ohio, have invented certain new and useful Improvements in Weighing-Scales, of which the following is a specification.

The present invention relates to that type of weighing scales in which a scale beam is pivotally mounted upon a suitable supporting base and the platform or platter for holding the commodity to be weighed is pivotally mounted upon the scale beam. It is customary in this type of scales to preserve the level of the platform or platter by providing the latter with a depending stem which passes down into the base and is connected with the latter by a link.

The object of the present invention is to improve the character of connection between the stem and the base so as to eliminate friction.

Where the connection consists merely of a strip or bar apertured in its ends to receive cotter pins or rivets connecting it with the stem and base, sufficient friction is sometimes produced through the placing of the load off-center on the platform or platter to materially affect the accuracy of the weighing. By the present invention friction is reduced to the minimum or practically eliminated so that wherever the load may rest on the platform or platter the weighing will be accurate.

In the accompanying drawing a sufficient portion of a scale of the above defined type is illustrated, partly in section and partly in side elevation, to make clear the application of the present invention thereto. In said drawing the reference numeral 2 designates a hollow supporting base, 3 a standard rising therefrom, 4 a scale beam pivotally mounted upon said standard with knife edge bearings 5, and 6 a platform or platter pivotally mounted upon a scale beam through knife edge bearings 7. A stem 8 is suitably secured to the central portion of the platform and passes down through an opening in the top of the base. In carrying out the present invention, this stem is formed in opposite sides at its lower end with conical sockets 9 and 10. Within the base in vertical alinement with the scale beam bearings, there is a depending post 11 secured to a block 12 adjustably fastened to the underside of the top of the base. In opposite sides of said post there are formed conical sockets 13 and 14 similar to the sockets 9 and 10 of the stem 8. The latter sockets have their bases in alinement on the central longitudinal line of the stem and the sockets 13 and 14 similarly have their bases in alinement on the central longitudinal line of the post 11. A rod or link 15 extends between the stem and the post and is formed with conical ends 16 and 17, the former seating in the socket 13 and the conical end 17 seating in the socket 9. A link or bar 18 extends under the stem and post and is formed with upturned ends 20 carrying cones 21 and 22 which seat in the sockets 14 and 10, respectively. The cone 20 may be simply riveted to the link or bar or secured therein by a drive fit or otherwise, whereas the cone 22 is preferably made in the form of a screw to provide for adjustment, a lock nut 24 being preferably employed to secure the cone at the proper adjustment. Block 12 is bored to receive the reduced portions of screws 24 shouldered to engage the upper side of the block and entering tapped openings in a boss 25 formed on the underside of the top of the base. A screw 26 passes loosely through a third bore in the block 12 and enters another tapped opening in the boss. It is essential that the distance from the point bearing provided by the cone 20 and the socket 14 to the knife edge bearing between the scale beam and the standard 3 shall be the same as the distance from the knife edge bearing between the platform and the scale beam and the point bearing provided by the cone 22 and the socket 10. The adjustable connection above described between the block 12 and the base 2 provides for making these distances exactly equal. It will, of course, be understood that the position of the block 12 is fixed by its being clamped against the shoulders of the screws 24 by the screw 26. To change the adjustment it is only necessary to turn back the screw 26 and the screws 24 and tighten the screw 26.

It will be noted that the above described construction provides for a parallelogram whose long sides run between the knife edge bearings 5 and 7 and the point bearings 21—14 and 22—10, respectively, and whose short sides run between the bearings 5 and 21—14 and the bearings 7 and 22—10, respectively. The links 15 and 18 are parallel and the sockets 9 and 10 are the same distance apart as the sockets 13 and 14, so that another parallelogram exists whose short sides extend between the point bearings 17—9 and 16—13 and the point bearings 22—10 and 21—14, respectively, and whose long sides extend between the point bearings 17—9, 22—10 and 16—13, 21—14, respectively. Thus, it will be obvious that the level of the weighing platform will be preserved as the same moves up and down. It will be observed that the form of connection between the platform and the base provided by the above described construction practically eliminates friction by reason of the point bearings, the parts composing the same being, of course, suitably hardened. It will be noted that if a weight is placed upon the platform off to the left, as the same appears in the drawing, the tendency to tilt the platform will be resisted by the cone 22 and should the weight be placed off to the right the tilting tendency will be resisted by the conical end 17 of the rod or link 15. With the above described arrangement it is impossible to create sufficient friction by placing the commodity off center on the platform, to affect the accuracy of the scales in weighing.

While thus well calculated to fulfil the object primarily stated, it is to be understood that the form of means here shown is susceptible of modification within the scope of the invention, as for instance in the contour of the bearings.

What is claimed is:

In weighing scales, the combination of a base having a depending post with socket bearings in opposite sides, their bases being in alinement lengthwise the post; a scale-beam pivoted on the base; a platform pivoted on said beam and having a depending stem with socket bearings in opposite sides, their bases being in alinement lengthwise the stem; a link extending between the stem and the post and having conical ends seating in the confronting sockets of the stem and post; and a link extending below the stem and the post and on the outer sides thereof and having cones seating in the sockets in such outer sides.

NIELS M. HANSEN.

Witnesses:
ALLEN DE VILBISS, Jr.,
M. L. THOMPSON.